United States Patent [19]

Van Tol

[11] Patent Number: 5,146,142
[45] Date of Patent: Sep. 8, 1992

[54] DYNAMIC FOCUSSING SIGNAL POWER AMPLIFIER FOR MAGNETICALLY FOCUSSED RASTER SCAN CATHODE RAY TUBE

[75] Inventor: Willem C. Van Tol, Knoxville, Tenn.

[73] Assignee: North American Philips Corporation, New York, N.Y.

[21] Appl. No.: 827,194

[22] Filed: Jan. 28, 1992

[51] Int. Cl.$^5$ .............................................. H01J 29/58
[52] U.S. Cl. ....................................... 315/382; 358/60
[58] Field of Search ................ 315/382, 382.1; 358/60, 358/218, 227

[56] References Cited

U.S. PATENT DOCUMENTS

| | | | |
|---|---|---|---|
| 3,906,303 | 9/1975 | Gerritsen | 315/370 |
| 3,906,305 | 9/1975 | Nillesen | 315/399 |
| 4,395,662 | 7/1983 | Sexton, Jr. | 358/60 |
| 4,485,335 | 11/1984 | Eames, Jr. | 315/382 |
| 4,546,291 | 10/1985 | Morioka et al. | 315/382 |
| 4,555,649 | 11/1985 | Sharma | 315/382 |
| 4,644,230 | 2/1987 | Federle | 315/382 |
| 4,707,639 | 11/1987 | Truskalo | 315/382 |

FOREIGN PATENT DOCUMENTS

| | | |
|---|---|---|
| 2017178 | 9/1976 | Fed. Rep. of Germany . |
| 1-108872 | 4/1989 | Japan . |
| 1-147968 | 6/1989 | Japan . |
| 2-13177 | 1/1990 | Japan . |
| 908755 | 10/1962 | United Kingdom . |
| 1323154 | 7/1973 | United Kingdom . |

Primary Examiner—Theodore M. Blum
Attorney, Agent, or Firm—William Squire

[57] ABSTRACT

A single power amplifier is provided both the horizontal and vertical focussing coils of each CRT of a red, blue and green CRT projection television system. Each amplifier includes an amplitude adjustment network to minimize spot size, an adder circuit for superimposing horizontal and vertical parabolic focussing voltages and a power amplifier stage for amplifying the superimposed voltages. The amplifier stage includes a differential amplifier comparator for converting with high gain the horizontal superimposed parabolic voltage into a saw tooth voltage superimposed on a vertical parabolic voltage which is applied to the vertical focussing coil. A passive capacitive filter filters out the vertical parabolic voltage, applies only the filtered saw tooth voltage to a transformer for stepping up the voltage. The stepped up saw tooth voltage is then applied to the horizontal focussing coil. The parabolic currents from the coils are combined and fed back to the differential amplifier as one input after conversion to a superimposed feedback voltage for comparison to the adjusted superimposed voltages from the adder circuit applied as a second input.

24 Claims, 4 Drawing Sheets

DYNAMIC FOCUSSING SIGNAL POWER AMPLIFIER FOR MAGNETICALLY FOCUSSED RASTER SCAN CATHODE RAY TUBE

BACKGROUND OF THE INVENTION

1. Field of the Invention

This invention relates to a circuit for amplifying dynamic focussing parabolic signals for magnetically focussing a scanning electron beam in a cathode ray tube (CRT).

Of interest is commonly owned copending application Ser. No. 800,891 entitled Dynamic Focussing Circuit for Cathode Ray Tube and Transformer for Use Therein filed Nov. 27, 1991 in the name of Golik.

2. Description of the Prior Art

Dynamic focussing circuits are widely used in television receivers for improving the focussing attributes of the electron beam scanned across the face of a CRT producing the display. The CRTs in use may either be electrostatic or magnetically driven devices. In an electrostatic CRT, the dynamic focussing circuit is voltage driven, the focussing signal comprising combined horizontal and vertical parabolic voltages applied to an electrode inside the CRT. The combined voltages are of relatively low power, i.e., low current. In a magnetically focussed CRT, focussing coils are external the CRT in the yoke region and are current driven. These coils need relatively high power to generate appropriate magnetic focussing fields internal the CRT to perform their focussing operation. Because of the relatively high power requirements and the need for appropriately shaped waveforms for driving the horizontal and vertical magnet focussing coils, a separate power amplifying stage is provided for the horizontal and for the vertical focussing coils.

The above noted copending application relates to an electrostatic focussing circuit. In addition to this copending application, examples of different kinds of dynamic focussing circuits are illustrated in U.S. Pat. No. 4,546,291, a magnetic coil focussing arrangement and U.S. Pat. No. 4,485,335, British 908,755 and Japanese Patent Application No. 62-308072, the latter referring to electrostatic focussing circuits.

The beam deflection coils, without a dynamic focussing correction circuit, exhibit undesirable defocussing of the beam spot at the phosphors of the display face due to the different radii of the display face receiving the scanning beam and that of the beam. Thus a different portion of the beam is incident on the display face edges of as compared to the face center. In the magnetic system, a horizontal parabolic signal unique to the horizontal focussing coil is applied to the horizontal focussing coil to correct for defocussing of the beam in the horizontal direction. A different vertical parabolic signal unique to the vertical focussing coil is applied to the vertical focussing coil to correct for defocussing of the beam in the vertical direction of the scan. These parabolas are generated at different frequencies corresponding to the vertical and horizontal scan rates, for example, 31.475 KHz horizontal rate and 60 Hz vertical rate in the U.S.

In a magnetic focussing system, the dynamic focussing circuits include a power output stage for each of the horizontal and vertical parabolic signals. The shape of the waveforms and their voltage and power levels is important. For example, a relatively low voltage, e.g., 20 volts, may be used to drive the vertical focussing coil while a relatively high voltage, e.g., 120 volts, drives the horizontal focussing coil. Further, a parabolic waveform is used to drive the vertical focussing coil and a saw tooth voltage is used to drive the horizontal focussing coil. The focussing signals are parabolic voltages which need to be power amplified to the appropriate power and voltage levels as well as converted to the appropriate waveshape for the designated magnetic coil. This makes the power output stages relatively costly as well as taking up real estate in the appropriate circuit boards.

This complexity and cost is not a problem in general television receivers which, for example, use only two power output stages. However, under development are high definition projection television receivers. The latter employ three CRTs each dedicated to a different color channel, e.g., red, blue and green. Since each CRT requires a pair of power output stages, this kind of receiver with three CRTs requires six output stages. The present inventor recognizes a need to reduce the number of, and thus the cost of, the power output stages in such an environment.

SUMMARY OF THE INVENTION

A dynamic focussing signal power amplifier circuit for a magnetically focussed raster scan cathode ray tube (CRT), the CRT having a first horizontal scan line frequency and a second vertical rate frequency, according to an embodiment of the present invention comprises means for receiving a horizontal parabolic dynamic focussing voltage at the first frequency, the horizontal voltage for controlling an electron beam horizontal scan focussing coil of the CRT and means for receiving a vertical parabolic dynamic focussing voltage at the second frequency, the vertical voltage for controlling an electron beam vertical focussing coil of the CRT. Means combine the received horizontal and vertical parabolic dynamic focussing voltages into a combined signal comprising a horizontal parabolic voltage superimposed on the vertical parabolic voltage. First amplifying means are responsive to the combined voltages for forming amplified superimposed horizontal and vertical magnetic focussing coil voltages adapted to drive the horizontal and vertical focussing coils.

In accordance with a further embodiment of the invention, the first means for amplifying includes conversion means for converting the horizontal parabolic voltage of the combined signal to an approximate saw tooth voltage superimposed on the vertical voltage and second amplifying means for amplifying the power of the superimposed parabolic and saw tooth voltage. The second means for amplifying includes filter means for removing the superimposed vertical voltage from the power amplified combined parabolic and saw tooth voltages to produce a filtered approximate saw tooth voltage waveform.

DETAILED DESCRIPTION OF THE PREFERRED EMBODIMENT

Figure 1:
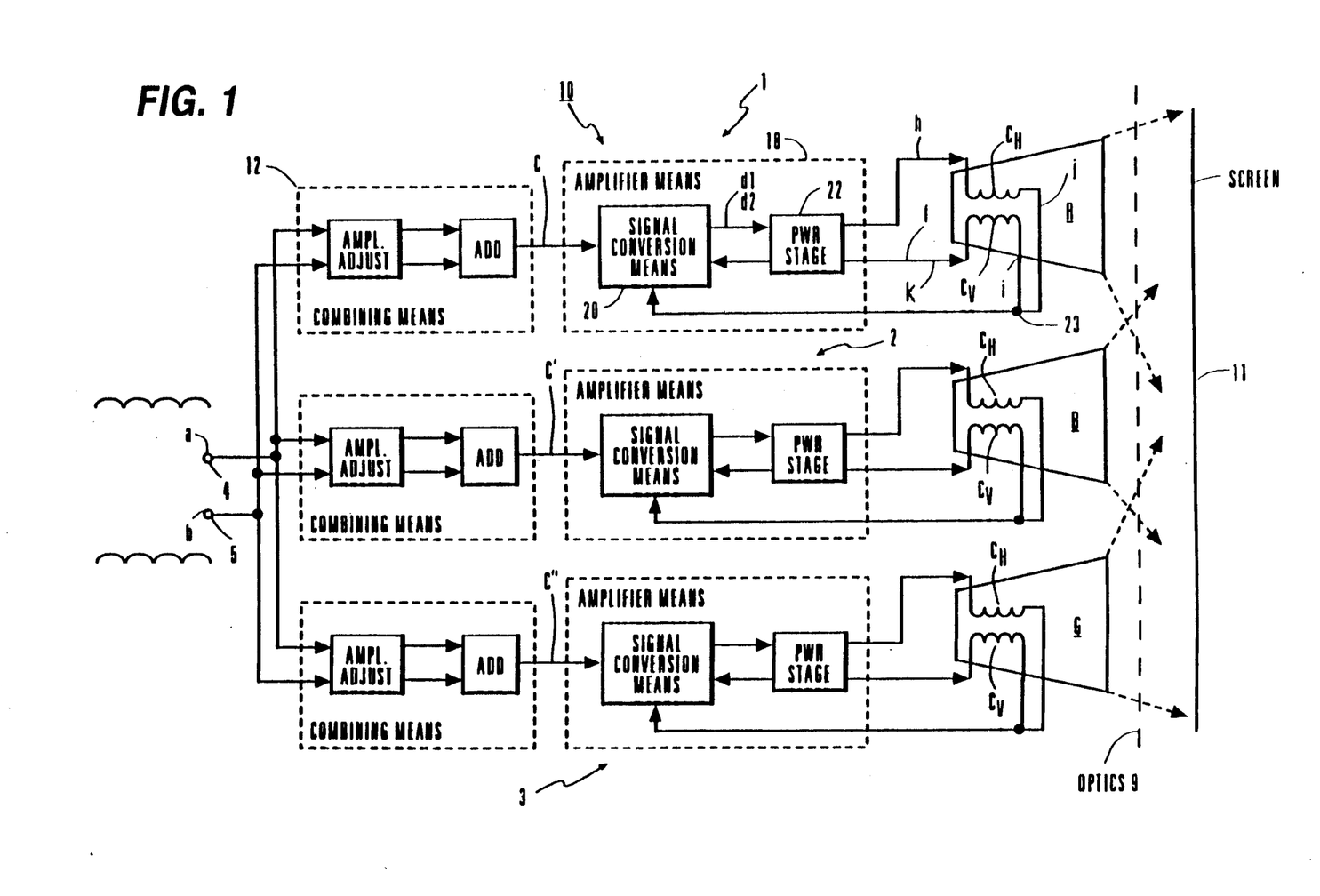
FIG. 1 is a diagram of a circuit according to one embodiment of the present invention illustrating a single power amplifier stage for each of red, blue and green CRTs.

In FIG. 1, television system 10 comprises respective identical red, blue and green color channel dynamic focussing circuits 1, 2 and 3. Circuits 1, 2 and 3 provide focusing signals to corresponding respective cathode ray tubes CRTs R, B and G. The CRTs respectively generate red, blue and green displays. These displays are imaged by optics 9, illustrated by a dashed line, on to display screen 11 in a known manner to form a composite color display. The system 10 is a component of a projection television receiver. The circuits 1, 2 and 3 are identical, therefore, only one representative circuit, circuit 1, for the red channel will be described in detail hereinbelow. It should be understood that the embodiment of the invention is not limited to projection television systems. Identical reference numerals in the different figures refer to identical elements.

Figure 4:
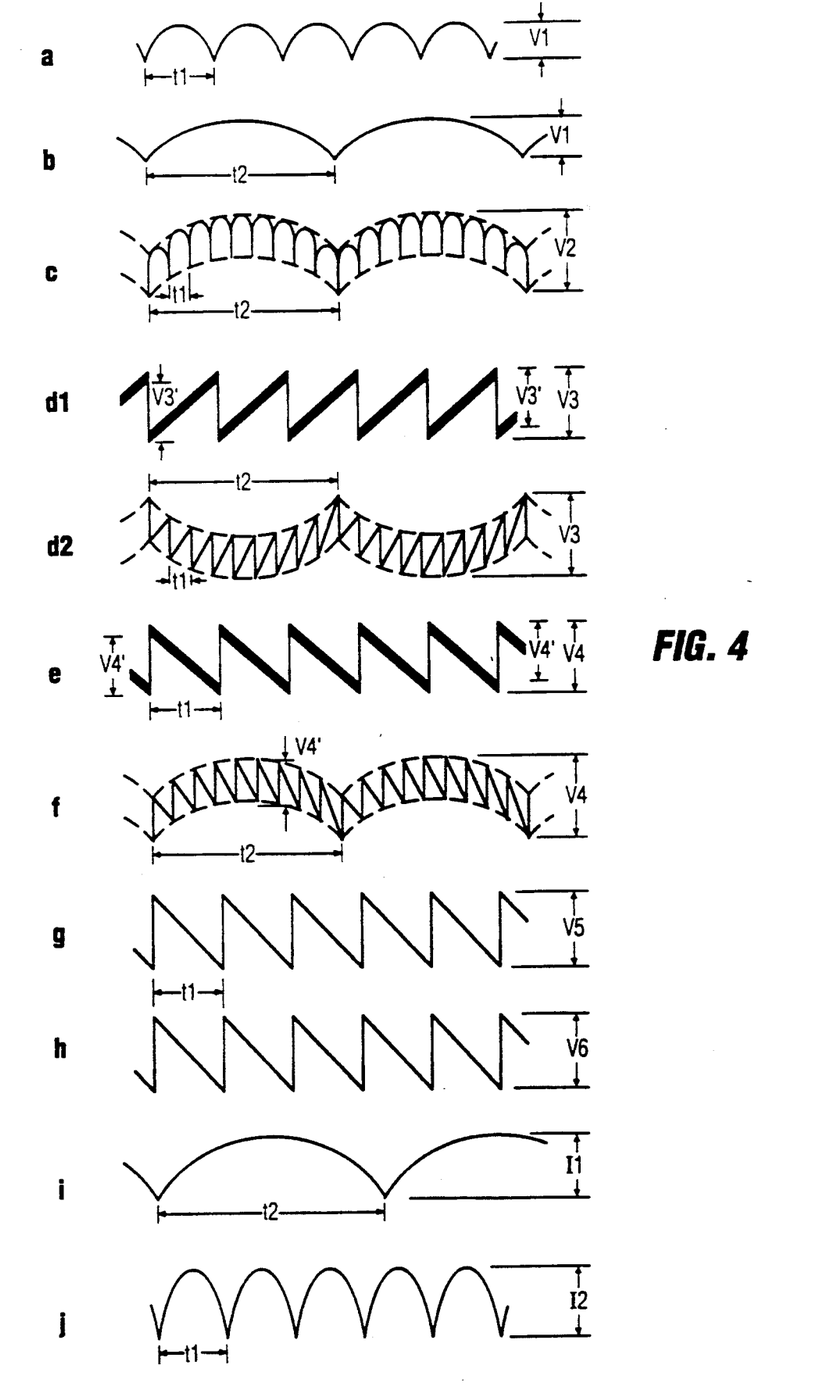
FIG. 4 is a waveform diagram illustrating waveforms at different points of the circuits of the embodiments of FIGS. 1, 2 and 3.

In the following description, the voltages referred to are illustrated in FIG. 4. A parabolic focussing voltage a, generated by means not shown at the horizontal scan frequency, is applied to terminal 4. A parabolic focussing voltage b, generated by means not shown at the vertical scan frequency, is applied to terminal 5. By way of example, voltages a and b may have a magnitude V1 of about 5 volts. Combining means 12 is connected to terminals 4 and 5 for superimposing voltages a and b. The combining means 12 includes an amplitude adjustment device 14 for adjusting the amplitudes of the respective received horizontal and vertical parabolic voltages a and b for the purpose of minimizing spot size in the horizontal and vertical directions on the R CRT display face, and thus on the screen 11. The amplitude adjusted parabolic voltages a and b are then superimposed on each other by adder 16 to form combined superimposed voltage c. By way of example, voltage c may be about 2.4 volts peak-to-peak. By way of further example, the period t1 of the horizontal parabolic voltage a is 31.75 μs and the period t2 of the vertical parabolic voltage b is 16.67 ms.

The superimposed voltage c is applied to amplifier means 18, and in particular, to signal conversion means 20. Conversion means 20 converts the voltage c to a voltage d2 in a form for power amplifying by power stage 22. In this form, the voltage d2 comprises two components, an approximate saw tooth voltage d1 superimposed on the voltage b, inverted as shown. Voltages d1 and d2 have a peak-to-peak amplitude V3, which may be 2.0 volts, for example. The thickened dark ramp portion p of the saw tooth voltage d1 represents jitter due to the saw tooth wave displacing vertically as a result of being superimposed on the vertical parabolic voltage as would appear on a relatively fast oscilloscope setting. The voltage d2 is shown as it would appear on a relatively slow oscilloscope setting. The voltage d1 of the saw tooth wave has an absolute magnitude V3' by removing the vertical rate parabolic caused jitter. The saw tooth voltage d2 is shown ideally for purposes of illustration, but in practice would be distorted from the form shown in the exemplary embodiment described below. The way conversion means forms the waveforms d1 and d2 will be described below in connection with FIGS. 2 and 3.

The power stage 22 amplifies voltage d2 (and thus d1) forming inverted voltage f which is applied to the vertical focussing coil $C_V$. Voltage f comprises the amplified saw tooth voltage d1 inverted by the stage 22 to form saw tooth voltage e at the horizontal frequency superimposed with the amplified inverted parabolic voltage at the vertical frequency. The voltage f is amplified to a power level at voltage V4 sufficient for driving the vertical focussing coil $C_V$ of CRT R. It should be understood that the voltage e includes jitter, shown by the relatively thick ramp, introduced by the superimposed amplified parabolic voltage. The peak-to-peak current applied to the vertical coil $C_V$ may be about 0.3 amperes. Voltages e and f may have peak-to-peak amplitudes V4 of about 36 volts, it being understood that the peak-to-peak amplitude of the saw tooth voltage V4' portion necessarily is less than V4, for example 34 volts, assuming that the parabolic vertical rate caused jitter has an amplitude of about 2 volts.

Saw tooth voltage g is derived from voltage f by filtering. Voltage g comprises the saw tooth portion of voltage f after filtering and for example has a peak-to-peak voltage V5 of about 34 volts. Voltage g is derived internally by stage 22, for example, by passive filtering voltage f to remove the vertical rate parabolic voltage. This filtering is an important operation because only the saw tooth voltage g is then transformed to a higher voltage h, 240 volts peak-to-peak, at the desired power level, e.g., 250 milliamps peak-to-peak, while maintaining the needed saw tooth wave shape for driving the horizontal focussing coil $C_H$. The peak-to-peak current corresponding to voltage g for example is about 1.75 amperes, assuming a transformation ratio of 7:1, the filtered parabolic portion having a current amplitude of about 250 ma peak-to-peak, for example. The respective currents i and j produced by coils $C_V$ and $C_H$ are parabolic and have the peak-to-peak amplitudes mentioned above. The coils $C_H$ and $C_V$ outputs are connected together at junction 23 to superimpose the currents i and j. The superimposed currents are returned as relatively heavy current feedback to conversion means 20 to form voltage d2 in a manner to be described.

Figure 2:
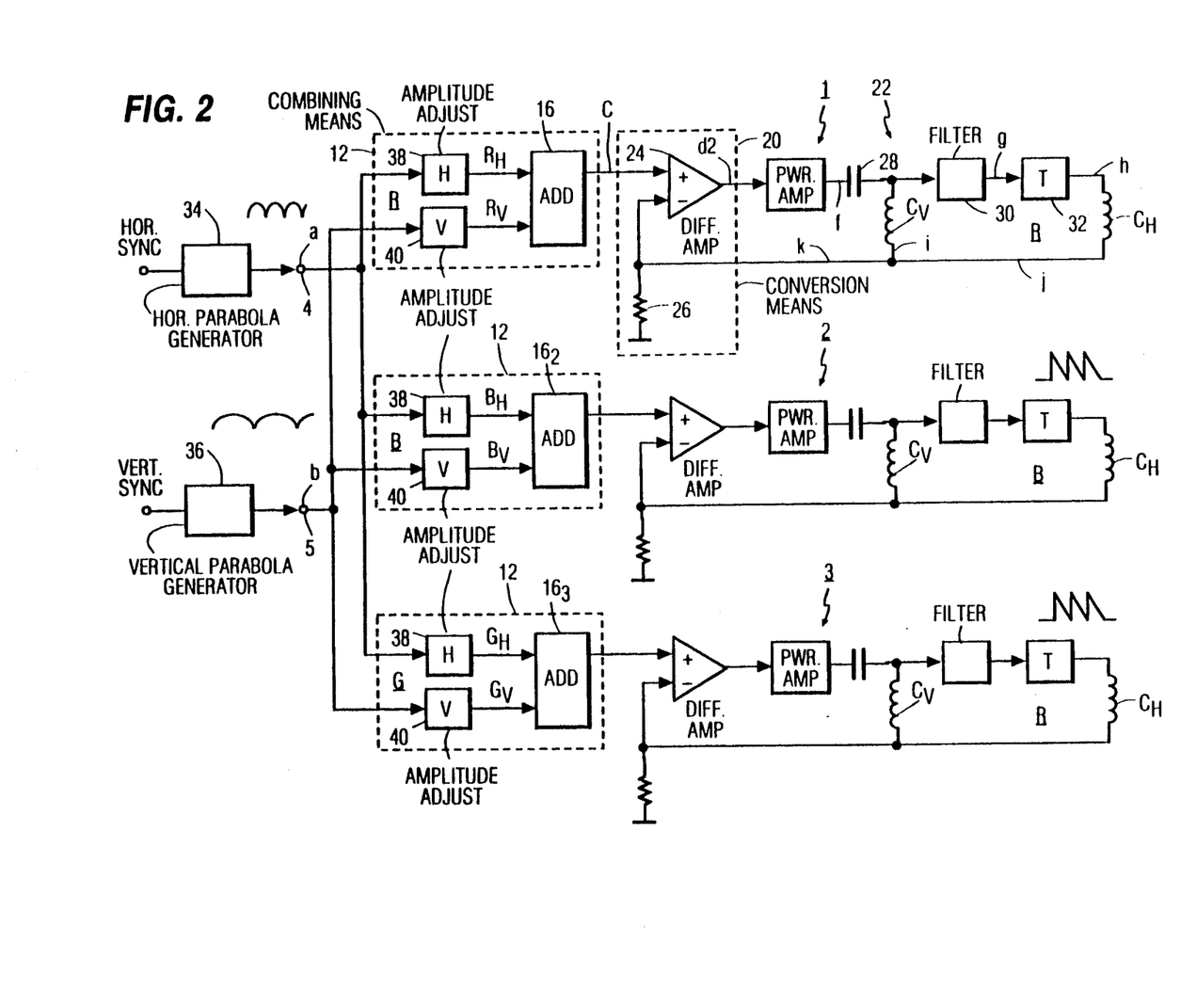
FIG. 2 is a more detailed diagram of the circuit of FIG. 1.

In FIG. 2, the conversion means 20 comprises a differential amplifier 24 having inverting and non-inverting inputs. The output of adder 16 is applied to the non-inverting input and the current feedback from the coils $C_V$ and $C_H$ is applied to the junction of a current sensing resistance 26 and the inverting input of amplifier 24. Amplifier 24 has relatively high gain, e.g., 100, so that the parabolic voltage manifesting the superimposed currents i and j applied to the inverting input are closely matched in phase as possible with the parabolic voltage applied to the non-inverting input from adder 16. The amplifier 24 due to its high gain and circuit characteristics converts the parabolic superimposed horizontal rate voltage into a saw tooth waveform as required by the horizontal coil. The vertical rate parabolic superimposed voltage is not converted because at a given self inductance and copper resistance of the vertical coil, the copper resistance dominates at the relative low vertical rate.

The inductance of the vertical rate coil $C_V$ is such that the resistance of the coil effectively filters the horizontal rate higher frequency superimposed saw tooth voltage without additional filtering. However, the inductance of coil $C_H$ is such that the vertical rate parabola needs to be filtered from the superimposed voltages to provide a correct focussing signal for the horizontal focussing coil and to separate the load on the vertical rate parabola by coil $C_H$.

A DC blocking capacitor 28 passes the amplified superimposed voltage f to coil $C_V$ and to filter 30 which filters the vertical rate parabola from voltage f as described above. The filtered horizontal rate voltage g is then transformed by transformer 32 into voltage h applied to coil $C_H$ completing the power stage 22. The transformer 32 increases the voltage of voltage g while decreasing its current so as provide the necessary drive voltage for coil $C_H$.

A horizontal rate parabolic generator 34 generates the horizontal parabolic voltage a in response to a horizontal synchronization signal applied as an input thereto. A vertical rate parabolic generator 36 generates the vertical parabolic voltage b in response to a vertical synchronization signal applied as an input thereto. Terminal 4 is connected to horizontal amplitude adjustment device 38 of each of circuits 1, 2 and 3. Terminal 5 is connected to vertical adjustment device 40 of each of circuits 1, 2 and 3. The outputs of devices 38 and 40 of circuit 1 are applied to adder $16_1$, the outputs of devices 38 and 40 of circuit 2 are applied to to adder $16_2$ of circuit 2 and so on. The output of adder $16_1$ is applied to the non-inverting input of amplifier 24 as discussed above. This arrangement is repeated for the other circuits 2 and 3.

Figure 3:
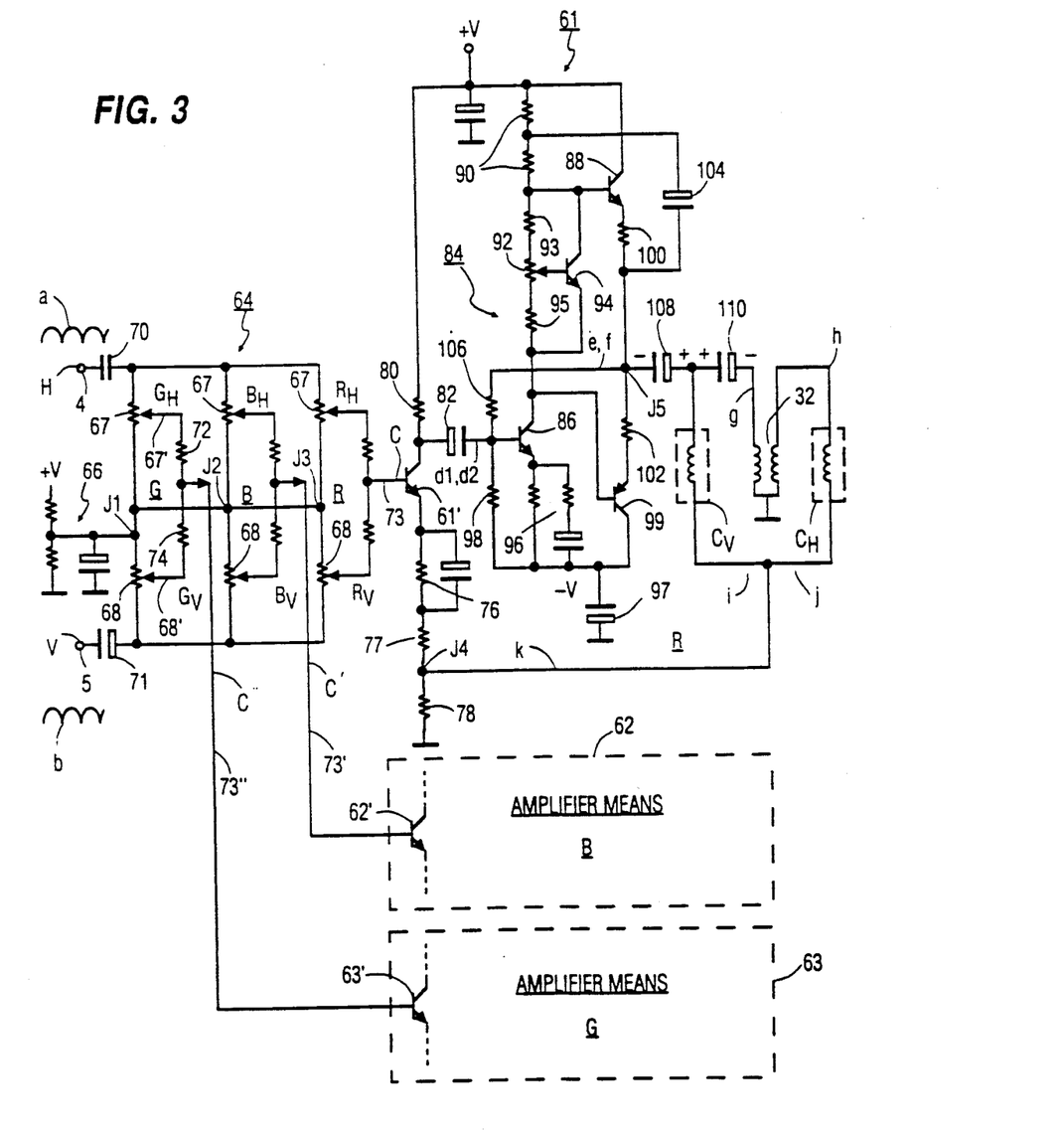
FIG. 3 is a circuit schematic illustrating a circuit for superimposing vertical and horizontal parabolic focussing voltages for each of the stages of FIG. 1 and an exemplary red channel power amplifier stage circuit representative of each channel power amplifier stage of the embodiment of FIGS. 1 and 2.

In FIG. 3, a specific embodiment is illustrated in accordance with one implementation of the present invention. Amplifier means circuits 61, 62 and 63 respectively correspond to the R, B and G color channels and represent one embodiment of amplifier means 18 of FIG. 1. Circuit 61 is shown and will be described in detail and is representative of circuits 62 and 63 shown in phantom. Network 64 comprises the amplitude adjustment devices and adders of FIGS. 1 and 2 for the three color channels R, B and G. Network 64 includes bias network 66 for biasing differential amplifier transistors 61', 62' and 63' of the different respective color channels. A bias voltage +V, for example 20 VDC, is applied to network 66. The network 66 is connected to the junctions J1, J2 and J3 of serially connected potentiometers 67 and 68 of like value, e.g., 10K ohms maximum value, of each of the respective R, B and G color channels. Each potentiometer 67 is connected to terminal 4 through coupling capacitor 70 and each potentiometer 68 is coupled to terminal 5 via coupling capacitor 71. Slider 67' of each potentiometer 67 is coupled to slider 68' of the corresponding potentiometer 68 of that color channel via serially connected resistors 72 and 74, which for example may be 22 k ohms and 68 k ohms, respectively. The junction of resistors 72 and 74 of each channel is connected to the base electrode of the corresponding differential amplifier transistor 61', 62' and 63' of respective amplifier means 61, 62 and 63 of the different color channels.

The potentiometer 67 adjusts the amplitude of the horizontal parabolic voltage a applied from terminal 4 and adjustment of the potentiometer 68 adjusts the amplitude of the vertical parabolic voltage b applied from terminal 5. These adjust the spot size of the image on the screen 11, FIG. 1, generated by the corresponding CRTs. Resistors 72 and 74 add the adjusted parabolic voltages superimposing them to form a voltage c, FIG. 4, for each channel. The adjusted superimposed voltages c for each channel are applied to the respective base (1, electrodes of differential amplifier transistors 61', 62' and 63' of the different R, B and G channels via respective lines 73, 73' and 73". Thus network 64 includes first, second and third sets of similarly connected potentiometers 67 and 68 and similarly connected sets of corresponding serially connected resistors 72 and 74 coupled to terminals 4 and 5 via respective capacitors 70 and 71, forming respective adjustment and adder networks for the red, blue and green channels.

Representative differential amplifier transistor 61' has its emitter coupled to ground via parallel resistor-capacitor stabilizing arrangement 76 and serially connected resistor 77 which sets the gain relatively high as mentioned above and resistor 78. Resistor 78 has a relatively low value, e.g., 6.8 ohms, for transforming the superimposed currents i and j, current k, into a parabolic voltage for comparison to voltage c. The junction J4 of resistors 77 and 78 is connected to the outputs of coils $C_V$ and $C_H$ to receive superimposed parabolic current k producing a superimposed parabolic voltage at the emitter of transistor 61' manifesting the current k.

The collector of transistor 62 is coupled via voltage sensing resistor 80 to a voltage source +V, which may be about 20 volts. Transistor 61' compares the base electrode voltage c to that at the emitter producing an output at the collector, voltage d2. The feedback superimposed current k produces a corresponding voltage at the emitter because of resistor 78 which voltage due to relatively high gain of the circuit is forced into close phase matching with the base voltage c to produce a superimposed saw tooth and parabolic waveform d2. The horizontal parabolic voltage is forced into a saw tooth shape by the circuit characteristics.

DC blocking capacitor 82 couples the transistor 61' collector to amplifier network 84, and in particular to the base electrode of high gain amplifier transistor 86. This base electrode is coupled to −V via resistor 98 and to the power output stage at junction J5 via resistor 106 to establish mid-point DC bias and internal AC stability for the power output stage. The transistor 86 emitter is coupled to −V via RC network 96 such that the gain of network 84 is set relatively high. Network 84 includes temperature stabilizing transistor 94 whose collector is connected to the base electrode of power amplifier transistor 88 and to voltage +V via serially connected biasing resistors 90. The base electrode of transistor 94 is connected to the slider of potentiometer 92. Potentiometer 92 is serially connected to resistors 90 via resistor 93 and to the collector of transistor 86 via resistor 95 to provide bias. The emitter of transistor 94 is connected to the collector of transistor 86. Potentiometer 92 is set for optimal DC idling current for the output power transistors 88 and 99.

The voltage +V is coupled to −V via serially coupled collector-emitter of power amplifier NPN transistor 88, resistors 100 and 102 and the emitter-collector of power amplifier PNP transistor 99. Capacitor 97 is coupled between −V and ground. The base electrode of transistor 99 is connected to the collector of transistor 86. Capacitor 104 is coupled to the junction J5 of resistors 100 and 102 and to the junction of biasing resistors 90. Capacitor 104 is a bootstrap capacitor to insure the voltage amplified can obtain a maximum voltage swing close to +/−V. The power amplified voltage f appears at junction J5 of resistor 100 and 102 coupled to the base electrode of transistor 86 via resistor 106.

By providing high gain to the network 84, the circuit forces the superimposed voltage corresponding to the feedback current k to closely match the base electrode voltage c of differential amplifier transistor 61'. In so doing, the parabolic horizontal voltage is forced into a saw tooth shape at junction J5.

The junction J5 is coupled to coil $C_V$ through DC blocking capacitor 108. Filter capacitor 110 is connected between the junction of capacitor 108 and coil $C_V$ and the primary winding of voltage step up transformer 32. The secondary winding of transformer 32 is connected to coil $C_H$ and for example steps up the voltage the 7:1 ratio mentioned above to 240 Volts peak-to-peak. Capacitor 108 may have a value of 1000 $\mu f$ and capacitor 110 may have a value of 10 $\mu f$ in this embodiment. Capacitor 110 effectively filters the vertical rate parabola from the superimposed voltage f (and e) appearing at junction J5. The filtered voltage is applied to the transformer 32 primary winding. The circuits coupled to transistors 62' and 63' for the respective blue and green channels are identical to network 84.

In operation, in FIG. 1, the blue and green CRTs are covered so that only the red CRT images the screen 11. The horizontal and vertical parabolas are adjusted in amplitude by observation of the spot sizes as they appear on screen 11. To do this the potentiometers 68 for the red channel are adjusted to minimize the observed spot size. This is repeated for the other channels in any desired sequence. When the parabolic superimposed voltages are so adjusted, the differential amplifiers then compare these voltages to the converted current feedback from the horizontal and vertical coils to form the superimposed voltage f in each channel. This voltage is applied directly to the vertical coil $C_V$ and as a saw tooth voltage to the horizontal coil via filter capacitor 110 and transformer 32.

Given the extreme difference in frequency between the horizontal and vertical rates, a passive filtering network in accordance with the present invention can be obtained in a simple way. Other kinds of circuits can be derived for accomplishing this aim including eliminating the transformer in combination with certain coils of a given implementation. That is, different coils of different characteristics may not, for example, need a transformer in order to operate in a given environment. Other filtering techniques may be used in place of the filter capacitor disclosed to accomplish the desired separation of the horizontal and vertical rate signals.

What is claimed is:

1. Dynamic focussing signal power amplifier circuit for a magnetically focussed raster scan cathode ray tube (CRT), said CRT having a first horizontal scan line frequency and a second vertical rate frequency, said circuit comprising:
   means for receiving a horizontal parabolic dynamic focussing voltage at said first frequency, said horizontal voltage for controlling an electron beam horizontal scan focussing coil of said CRT;
   means for receiving a vertical parabolic dynamic focussing voltage at said second frequency, said vertical voltage for controlling an electron beam vertical focussing coil of said CRT;
   means for combining said received horizontal and vertical parabolic dynamic focussing voltages into a combined signal comprising a horizontal parabolic voltage superimposed on the vertical parabolic voltage; and
   first amplifying means responsive to said combined voltages for forming amplified horizontal and vertical magnetic focussing coil voltages adapted to drive said horizontal and vertical focussing coils.

2. The circuit of claim 1 wherein said first means for amplifying includes conversion means for converting said horizontal parabolic voltage of said combined signal to an approximate saw tooth voltage superimposed on said vertical voltage and second amplifying means for amplifying the power of said superimposed parabolic and saw tooth voltages.

3. The circuit of claim 2 wherein said second means for amplifying includes filter means for removing said superimposed vertical voltage from said power amplified combined parabolic and saw tooth voltages to produce a filtered approximate saw tooth voltage waveform.

4. The circuit of claim 3 wherein said second amplifying means includes transformer means for converting said power amplified filtered saw tooth voltage to a relatively high voltage.

5. The circuit of claim 2 including means for applying said superimposed vertical parabolic and saw tooth horizontal voltages to said vertical focussing coil.

6. The circuit of claim 3 including horizontal and vertical focussing coils, said vertical coil having a first parabolic current output in response to said power amplified superimposed parabolic and saw tooth voltages applied as an input thereto, said horizontal coil having a second parabolic current output in response to said filtered amplified saw tooth voltage applied thereto, said conversion means including means responsive to said superimposed parabolic voltages applied as one input thereto and a feedback signal manifesting said parabolic currents combined and applied as a second input thereto for producing said superimposed saw tooth and parabolic voltages.

7. The circuit of claim 3 wherein said second means for amplifying includes means for filtering said amplified superimposed parabolic and saw tooth voltages to produce a filtered saw tooth voltage at the horizontal frequency and for applying the filtered saw tooth voltage to said horizontal coil.

8. The circuit of claim 1 further including horizontal and vertical focussing coils, said first means for amplifying including means for converting the horizontal parabolic voltage to an approximate saw tooth voltage to provide superimposed vertical parabolic and saw tooth voltages, second amplifying means for amplifying the converted voltages, means for filtering the combined converted voltages to produce an approximate saw tooth voltage at the horizontal frequency, transformer means for transforming the voltage of the filtered saw tooth voltage to a relatively high voltage value, means for applying said amplified combined signal to said vertical coil and means for applying the relatively high value saw tooth voltage to said horizontal coil.

9. The circuit of claim 8 wherein said combining means superimposes the received horizontal and vertical parabolic voltages, said vertical and horizontal coils producing respective parabolic currents from said parabolic and saw tooth voltages applied thereto, means for superimposing said parabolic currents, said means for converting including comparison means responsive to said superimposed voltages applied as one input thereto and a voltage manifesting said superimposed parabolic currents applied as a second input thereto.

10. The circuit of claim 1 wherein said means for combining said received signals includes adjusting means for adjusting the amplitudes of said horizontal and vertical parabolic signals to reduce to a minimum the spot size produced by said amplified combined signal on said CRT.

11. The circuit of claim 10 including horizontal and vertical CRT focussing coils, said first means for amplifying including means for converting the horizontal parabolic voltage to an approximate saw tooth voltage to provide superimposed vertical parabolic and approximate saw tooth voltages, means for filtering the combined converted signal to produce a filtered approximate saw tooth voltage, transformer means for increasing the voltage of said filtered saw tooth voltage to a relatively high value, means for applying said amplified combined signal to said vertical coil and means for applying the relatively high value voltage to said horizontal coil, said means for converting including comparison means responsive to the added adjusted signals applied as one input thereto, said amplified parabolic and saw tooth voltages applied to said coils producing respective output currents and means for combining the output currents into a feedback signal and for applying the feedback signal as a second input to said comparison means.

12. The circuit of claim 10 including first, second and third adjusting means and first, second and third adding means corresponding respectively to and responsive to said first, second and third adjusting means to produce first, second and third periodic superimposed vertical and horizontal parabolic voltages each corresponding to a different respective CRT red, blue and green color channel.

13. The circuit of claim 2 including first, second and third means for combining for producing respective first, second and third combined superimposed parabolic voltages and first, second and third amplifying means for respectively converting each said first, second and third superimposed parabolic voltages to a superimposed vertical parabolic and horizontal approximate saw tooth voltage, said first, second and third amplifying means corresponding to respective red, blue and green color channels.

14. The circuit of claim 13 including first, second and third CRTs each having horizontal and vertical focussing coils, each CRT corresponding respectively to said red, blue and green channels, the horizontal and vertical coils of each CRT for receiving a respective different one of a corresponding parabolic and saw tooth amplified voltage for focussing a corresponding CRT red, blue and green scan electron beam.

15. The circuit of claim 14 including filter means for removing the vertical parabolic voltage from the superimposed parabolic and saw tooth voltages applied to each said horizontal coil.

16. The circuit of claim 6 wherein the vertical coil has an inductance and resistance such as to make substantially ineffective the high frequency components of said superimposed saw tooth voltage on said vertical coil.

17. A power output circuit for a television display system including first, second and third cathode ray tubes (CRT) corresponding to respective red, blue and green color channels, said system comprising:

means for receiving first, second and third parabolic dynamic horizontal focussing signals for respective first, second and third CRT horizontal focussing coils of said system;

means for receiving first, second and third parabolic dynamic vertical focussing signals for respective first, second and third CRT vertical focussing coils of said system;

adjustment means for adjusting the amplitude of each said first, second and third horizontal and vertical signals for adjusting the spot size of the focussed beam generated by a corresponding CRT of said system;

means for superimposing the adjusted first horizontal and vertical signals, for superimposing the adjusted second horizontal and vertical signals and for superimposing the adjusted third horizontal and vertical signals to form first, second and third superimposed parabolic signals as first, second and third respective output signals therefrom;

conversion means responsive to said output signals for forming respective first, second and third approximate saw tooth voltages respectively superimposed on said first, second and third adjusted vertical parabolic signals;

means for amplifying the superimposed first, second and third parabolic signals and saw tooth voltages; and means for applying the amplified superimposed parabolic signals and saw tooth voltages to corresponding first, second and third vertical and horizontal focussing coils of the respective CRTs of said system.

18. The circuit of claim 17 wherein said conversion means includes first, second and third differential amplifier means each having non-inverting and inverting inputs, said non-inverting input for receiving a different one of said first, second and third superimposed parabolic signals, the inverting input for receiving a feedback signal manifesting superimposed currents produced by corresponding horizontal and vertical coils.

19. The circuit of claim 17 including filter means for applying only the saw tooth voltage to said horizontal coil and transformer means for increasing the voltage of said latter saw tooth voltage.

20. A CRT dynamic focussing signal generating circuit, said CRT having horizontal and vertical focussing coils, said circuit; comprising:

CRT horizontal and vertical focussing coils;

means for receiving CRT horizontal and vertical focussing parabolic voltages;

means for adjusting the amplitude of said voltages to minimize CRT spot size of an electron beam focussed by said voltages;

means for superimposing the adjusted voltages;

means for converting the superimposed adjusted parabolic horizontal voltage to an approximate saw tooth voltage superimposed on said parabolic vertical voltage;

means for amplifying said converted superimposed voltages;

means for applying the converted amplified voltages to the vertical focussing coil, said vertical coil producing an output current;

means for filtering the vertical parabolic voltage from the converted amplified superimposed voltages to produce a filtered saw tooth voltage;

means for transforming the voltage level of the filtered saw tooth voltage to a higher level;

means for applying the transformed filtered saw tooth voltage to the horizontal coil, said horizontal coil producing an output current; and means for combining said output currents and applying a superimposed parabolic voltage signal manifesting said combined output currents to said means for converting to effect said converting.

21. Dynamic focussing signal power amplifier circuit for a raster scan cathode ray tube (CRT), said CRT having a first horizontal scan lines frequency and a second vertical rate frequency, said circuit comprising:
  means for receiving a horizontal parabolic dynamic focussing voltage at said first frequency, said horizontal voltage for controlling an electron beam horizontal focussing coil of said CRT;
  means for receiving a vertical parabolic dynamic focussing voltage at said second frequency, said vertical voltage for controlling an electron beam vertical focussing coil of said CRT;
  means for superimposing said received horizontal and vertical parabolic dynamic focussing voltages into a combined signal comprising a horizontal parabolic voltage superimposed on the vertical parabolic voltage; and
  means for amplifying said combined superimposed voltages including means for converting the superimposed parabolic vertical and horizontal voltages into a vertical rate parabolic voltage superimposed with an approximate saw tooth horizontal rate voltage and for power amplifying said converted superimposed voltages.

22. The circuit of claim 21 including means for adjusting the amplitudes of said received voltages to minimize CRT spot size.

23. The circuit of claim 21 wherein said means for power amplifying said converted voltages includes includes filter means for filtering said parabolic vertical rate voltage out of said superimposed vertical rate and saw tooth horizontal rate voltages and means for applying the converted voltages to said vertical coil and said filtered voltage to said horizontal coil.

24. The circuit of claim 23 wherein said coils produce output currents in response to said converted superimposed and filtered voltages applied thereto, said means for converting including means for producing a composite superimposed parabolic voltages manifesting said output currents and means responsive to said combined superimposed parabolic voltages and to said composite superimposed parabolic voltages applied as inputs thereto.

* * * * *